United States Patent
Motieian Najar et al.

(10) Patent No.: US 10,386,256 B2
(45) Date of Patent: Aug. 20, 2019

(54) METHODS AND APPARATUS TO CALIBRATE MICRO-ELECTROMECHANICAL SYSTEMS

(71) Applicant: TEXAS INSTRUMENTS INCORPORATED, Dallas, TX (US)

(72) Inventors: Mohammad Hadi Motieian Najar, Santa Clara, CA (US); Ira Oaktree Wygant, Palo Alto, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 225 days.

(21) Appl. No.: 15/365,214

(22) Filed: Nov. 30, 2016

(65) Prior Publication Data

US 2018/0149540 A1 May 31, 2018

(51) Int. Cl.
*G01L 27/00* (2006.01)
*G01L 9/12* (2006.01)

(52) U.S. Cl.
CPC .............. *G01L 27/005* (2013.01); *G01L 9/12* (2013.01)

(58) Field of Classification Search
CPC ....... G01L 27/005; G01L 27/002; G01L 9/12; G01L 9/125; G01L 9/0072; G01L 9/0073; G01L 9/0075
USPC .......... 73/1.57, 1.59, 1.63, 1.64, 1.66, 1.67, 73/1.69, 718, 724; 702/98, 138, 140; 361/283.1, 283.3, 283.4
See application file for complete search history.

(56) References Cited

U.S. PATENT DOCUMENTS

| | | | |
|---|---|---|---|
| 4,951,236 A | 8/1990 | Kawate et al. | |
| 5,332,469 A | 7/1994 | Mastrangelo | |
| 5,471,882 A * | 12/1995 | Wiggins | G01L 9/0022 73/152.52 |
| 6,314,544 B1 | 11/2001 | Rey et al. | |
| 6,422,088 B1 | 7/2002 | Oba et al. | |
| 6,781,814 B1 | 8/2004 | Greene | |
| 6,862,525 B1 * | 3/2005 | Beason | G01C 21/20 701/454 |
| 2006/0161364 A1 | 7/2006 | Wang et al. | |
| 2008/0074250 A1 | 3/2008 | Tsai | |

(Continued)

OTHER PUBLICATIONS

Marten Vranes, "Cost of MEMS Testing: A Strategic Perspective," 3rd Annual MTR Conference, Oct. 2011, MEMS Investor Journal, 44 pages.

(Continued)

*Primary Examiner* — Robert R Raevis
(74) *Attorney, Agent, or Firm* — Michael A. Davis, Jr.; Charles A. Brill; Frank D. Cimino

(57) ABSTRACT

Methods and apparatus to calibrate micro-electromechanical systems are disclosed. An example pressure sensor calibration apparatus includes a mechanical lift to move a pressure sensor between a first height, a second height, and a third height; one or more sensors to measure first pressure and capacitance values at the first height, second pressure and capacitance values at the second height, and third pressure and capacitance values obtained at the third height; and a calibrator to determine calibration coefficient values to calibrate the pressure sensor based on the first pressure and capacitance values obtained at the first height, the second pressure and capacitance values at the second height, and the third pressure and capacitance values obtained at the third height.

11 Claims, 4 Drawing Sheets

(56) References Cited

U.S. PATENT DOCUMENTS

| | | |
|---|---|---|
| 2012/0017703 A1 | 1/2012 | Ikebe et al. |
| 2012/0073940 A1 | 3/2012 | Masunishi et al. |
| 2013/0126994 A1 | 5/2013 | Hwang et al. |
| 2013/0257456 A1 | 10/2013 | Liu et al. |
| 2014/0253142 A1 | 9/2014 | Fink et al. |
| 2014/0266263 A1 | 9/2014 | Wurzinger et al. |
| 2016/0018281 A1 | 1/2016 | Hammerschmidt |

OTHER PUBLICATIONS

Michael Gaitan, "Key Findings of iNEMI MEMS Roadmap," iNEMI MEMS Workshop, May 10, 2012, 24 pages.

Cozma, et al; Electrostatic actuation as a self-testing method for silicon pressure sensors; Katholieke Universitei Leuven, Sensors and Actuators A60; 1997; pp. 1-5.

\* cited by examiner

METHODS AND APPARATUS TO CALIBRATE MICRO-ELECTROMECHANICAL SYSTEMS

FIELD OF THE DISCLOSURE

This disclosure relates generally to micro-electromechanical systems, and, more particularly, to methods and apparatus to calibrate micro-electromechanical systems.

BACKGROUND

Micro-electromechanical systems (MEMS) such as, for example, pressure sensors are relatively nonlinear devices. Based on this nonlinearity and differences between pressure sensors, typically, each pressure sensor is individually calibrated. Such an approach may increase the capital cost of equipment used to calibrate the pressure sensors and/or increase the time dedicated to calibrating each of the pressure sensors.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
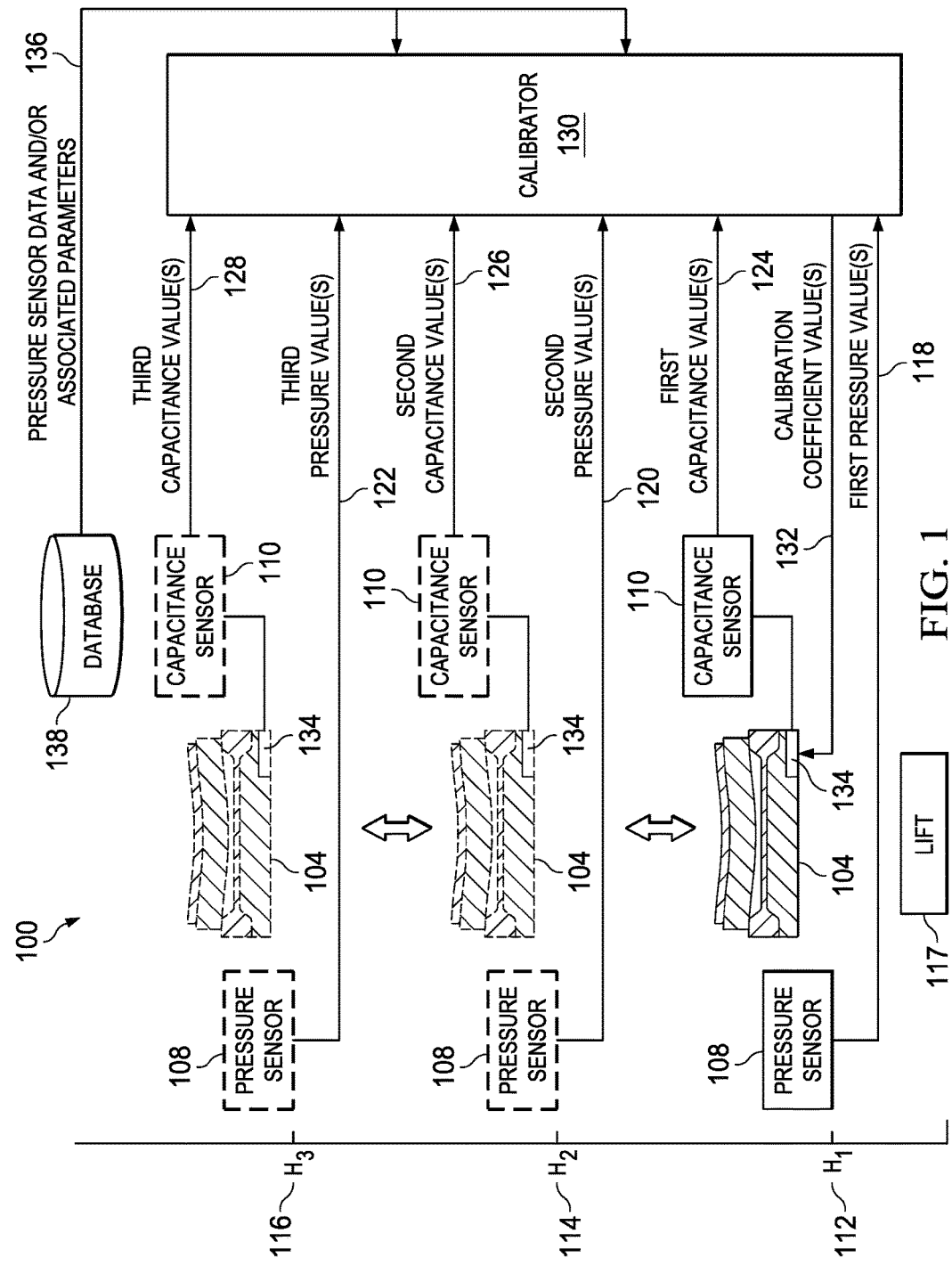
FIG. 1 is a schematic illustration of an example system to calibrate micro-electromechanical systems in accordance with the teachings of this disclosure.

The examples disclosed herein relate to calibrating micro-electromechanical systems (MEMS) such as, for example, pressure sensors and/or capacitive based barometric pressure sensors. Specifically, the examples disclosed herein relate to calibrating pressure sensors based on values obtained when testing the pressures sensors at different positions. By taking such an approach, the examples disclosed herein enable the efficient calibration of a large quantity of pressure sensors at, for example, ambient pressure using equipment that may be obtained at a relatively low cost.

In some examples, the testing includes positioning a pressure sensor at different heights and measuring the capacitance and pressure at the respective heights. For example, an example calibration system may measure a first pressure value, $P_{h1}$, and a first capacitance value, $C_{h1}$, at a first height, $h_1$, a second pressure value, $P_{h2}$, and a second capacitance value, $C_{h2}$, at a second height, $h_2$, and a third pressure value, $P_{h3}$, and a third capacitance value, $C_{h3}$, at a third height, $h_3$.

Based on the pressure values determined at the different heights, in some examples, Equation 1 is used to determine an average pressure, $P_{avg1,2}$, between the first and second pressure values, $P_1$, $P_2$, and Equation 2 is used to determine an average pressure, $P_{avg2,3}$, between the second and third pressure values, $P_2$, $P_3$.

$$P_{avg1,2} = \frac{P_{h1} + P_{h2}}{2} \quad \text{Equation 1}$$

$$P_{avg2,3} = \frac{P_{h2} + P_{h3}}{2} \quad \text{Equation 2}$$

Based on the capacitance values determined at the different heights, in some examples, Equation 3 is used to determine an average capacitance, $C_{avg1,2}$, between the first and second capacitance values, $C_1$, $C_2$ and Equation 4 is used to determine an average capacitance, $C_{avg2,3}$, between the second and third capacitance values, $C_2$, $C_3$.

$$C_{avg1,2} = \frac{C_{h1} + C_{h2}}{2} \quad \text{Equation 3}$$

$$C_{avg2,3} = \frac{C_{h2} + C_{h3}}{2} \quad \text{Equation 4}$$

Based on the pressure and capacitance values determined at the different heights, in some examples, Equation 5 is used to represent the capacitance-pressure sensitivity, $S_{CP1,2}$, at the first and second heights and Equation 6 is used to represent the capacitance-pressure sensitivity, $S_{CP2,3}$ at the second and third heights.

$$S_{CP1,2} = \frac{\Delta C_{1,2}}{\Delta P_{1,2}} = \frac{C_{h2} - C_{h1}}{P_{h2} - P_{h1}} \quad \text{Equation 5}$$

$$S_{CP2,3} = \frac{\Delta C_{2,3}}{\Delta P_{2,3}} = \frac{C_{h3} - C_{h2}}{P_{h3} - P_{h2}} \quad \text{Equation 6}$$

To determine attributes of the pressure sensor being calibrated such as, for example, an effective gap, $g_{eff}$, and/or the plate thickness, t, in some examples, Equations 7 and 8 are used in combination with the results of the testing and/or Equations 1-6, for example. Referring to Equations 7 and 8, $\varepsilon_0$ refers to the permittivity of the free space within the pressure sensor being calibrated, $A_p$ refers to the plate area of the pressure sensor being calibrated and $C_{par}$ refers to the parasitic capacitance and/or the parasitic offset (e.g., 3.2 picofarads (pF)) of the pressure sensor being calibrated. Referring further to Equations 7 and 8, $C_{dyn}$ refers to the dynamic capacitance of the pressure sensor being calibrated, a refers to the plate radius of the pressure sensor being calibrated, v refers to Poisson's ratio, and E refers to Young's modulus.

$$g_{eff} = \left[ \frac{\varepsilon_0 A_p}{2P_{avg,1,2}\left(\frac{\Delta C_{1,2}}{\Delta P_{1,2}}\right) + (C_{dyn} - C_{par})} \right] + \quad \text{Equation 7}$$

$$P_{avg1,2}\left[ \frac{12a^4(1-v^2)}{64E} \right]\frac{1}{t^3}$$

-continued $$g_{eff} = \left[\frac{\varepsilon_0 A_p}{2P_{avg,2,3}\left(\frac{\Delta C_{2,3}}{\Delta P_{2,3}}\right)+(C_{dyn}-C_{par})}\right]+ \quad \text{Equation 8}$$

$$P_{avg2,3}\left[\frac{12a^4(1-v^2)}{64E}\right]\frac{1}{t^3}$$

To determine other values and/or to extrapolate the capacitance and pressure values determined when positioning the pressure sensor at different heights, in some examples, a sensor equation fit is used such as, for example, the sensor equation fit of Equation 9. In some examples, the sensor equation fit is based on a non-linear fitting algorithm called Levenberg-Marquardt. Referring to Equation 9, $x_p$ refers to the peak plate displacement of the pressure sensor being calibrated as defined by Equation 10 and $\delta x_p$ refers to the displacement adjustment (e.g., zero offset) of the pressure sensor being calibrated.

$$C = \frac{A_p \varepsilon_0 \, a\tanh\left(\sqrt{\frac{x_p+\delta x_p}{g_{eff}}}\right)}{\sqrt{g_{eff}(x_p+\delta x_p)}}+C_{par} \quad \text{Equation 9}$$

Referring to Equation 10, D corresponds to the flexural rigidity of the pressure sensor being calibrated as defined in Equation 11.

$$x_p = \frac{Pa^4}{64D} \quad \text{Equation 10}$$

Referring to Equation 11, E refers to Young's modulus, v refers to Poisson's ratio and t refers to the thickness of the plate determined using Equations 7 and 8.

$$D = \frac{Et^3}{12(1-v^2)} \quad \text{Equation 11}$$

In some examples, to reduce the complexity of the solution, a polynomial fit is performed on the squared inverted results of the sensor equation fit using, for example, Equation 12. Referring to Equation 12, C refers to the capacitance determined using Equation 9, $a_i$ refers to the polynomial coefficients and $\hat{P}$ refers to the pressure result vector from the polynomial fit. In some examples, the polynomial fit performed is a 4th order polynomial fit and the output includes calibration coefficient values to calibrate the second pressure sensors.

$$\hat{P}(C) = \sum_{i=1}^{n+1} a_i \left(\frac{1}{C-C_{par}}\right)^{2(n-i+1)} \quad \text{Equation 12}$$

FIG. 1 illustrates an example calibration system 100 that can be used to calibrate micro-electromechanical systems (MEMS) including pressure sensors in a cost effective and efficient manner. In the illustrated example, the calibration system 100 performs physical tests on a pressure sensor 104 and uses the results of the physical tests to determine calibration coefficient values. While the illustrated example depicts one pressure sensor (i.e., the pressure sensor 104), in other examples, any number of pressure sensors may be used. To enable the physical tests to be performed on the pressure sensor 104, in the illustrated example, the calibration system 100 includes an example pressure sensor and/or gauge 108 and an example capacitance sensor 110.

In the example of FIG. 1, to perform the physical tests on the pressure sensor 104, the calibration system 100 positions the pressure sensor 104 at different heights 112, 114, 116 using a lift 117 and the pressure sensor 108 and the capacitance sensor 110 determine pressure and capacitance values at the different heights. The calibration system 100 may move the pressure sensor 104 to the different heights 112, 114, 116, etc. in different ways such as, for example, using a movable platform, an elevator or any other device (e.g., a mechanical device, an electro-mechanical device) or, more generally, the lift 117, that can move the pressure sensor 104 between different positions.

In the illustrated example, when the calibration system 100 positions the pressure sensor 104 at the first height 112, the second height 114 and the third height 116, the pressure sensor 108 measures first, second and third pressure values 118, 120 and 122 at the respective heights 112, 114, 116. Similarly, in the illustrated example, when the calibration system 100 positions the pressure sensor 104 at the different heights 112, 114, 116, the capacitance sensor 110 measures first, second and third capacitance values 124, 126 and 128 at the respective heights 112, 114, 116. In other examples, the pressure values 118, 120, 122 may be determined using an equation(s) that relates height and pressure such as Equation 13. Referring to Equation 13, $P_0$ refers to the reference pressure at $h_1$, R* refers to the gas constant, M refers to molar mass of Earth's air: 0.0289644 kg/mol, g refers to the gravitational acceleration: 9.80665 m/s², z refers to the height change from $h_1$ and T refers to the the temperature at $h_1$.

$$P = P_0 e^{-Mgz/R^*T} \quad \text{Equation 13:}$$

In such examples, the pressure sensor 104 may not be included. In some examples, results 300 of the physical tests conducted on the pressure sensor 104 are plotted on a graph 302 depicted in FIG. 3, where an x-axis 304 represents pressure and a y-axis 306 represents capacitance.

Referring back to the example of FIG. 1, the pressure gauge 108 and/or the capacitance sensor 110 provide or otherwise enable an example calibrator 130 to access the first, second and third pressure value(s) 118, 120 and 122 and the first, second and third capacitance value(s) 124, 126, 128 for further processing. In some examples, the further processing includes the calibrator 130 determining calibration coefficient values 132 that can be used to calibrate the pressure sensor 104 and/or are stored on a data store 134 of the pressure sensor 104. The calibration coefficient values 132 may be determined based on the first, second and third pressure values 118, 120, 122, the first, second and third capacitance values 124, 126 and 128 and/or pressure sensor data and/or associated parameters 136 from a database 138.

In some examples, the pressure sensor data and/or associated parameters 136 include, for example, a permittivity of the free space within the pressure sensor 104, $\varepsilon_0$, a plate area of the pressure sensor 104, $A_p$, the dynamic capacitance of the pressure sensor 104, $C_{dyn}$, and/or a parasitic offset of the pressure sensor 104, $C_{par}$. In some examples, the pressure sensor data and/or associated parameters 136 include, for example, a plate radius of the pressure sensor 104, a, Young's modulus, E, Poisson's ratio, v, the thickness of the plate, t, the peak plate displacement of the pressure sensor 104, $x_p$, the displacement adjustment (e.g., zero offset) of the pressure sensor 104, $\delta x_p$, and/or the flexural rigidity of the pressure sensor 104, D.

Figure 2:
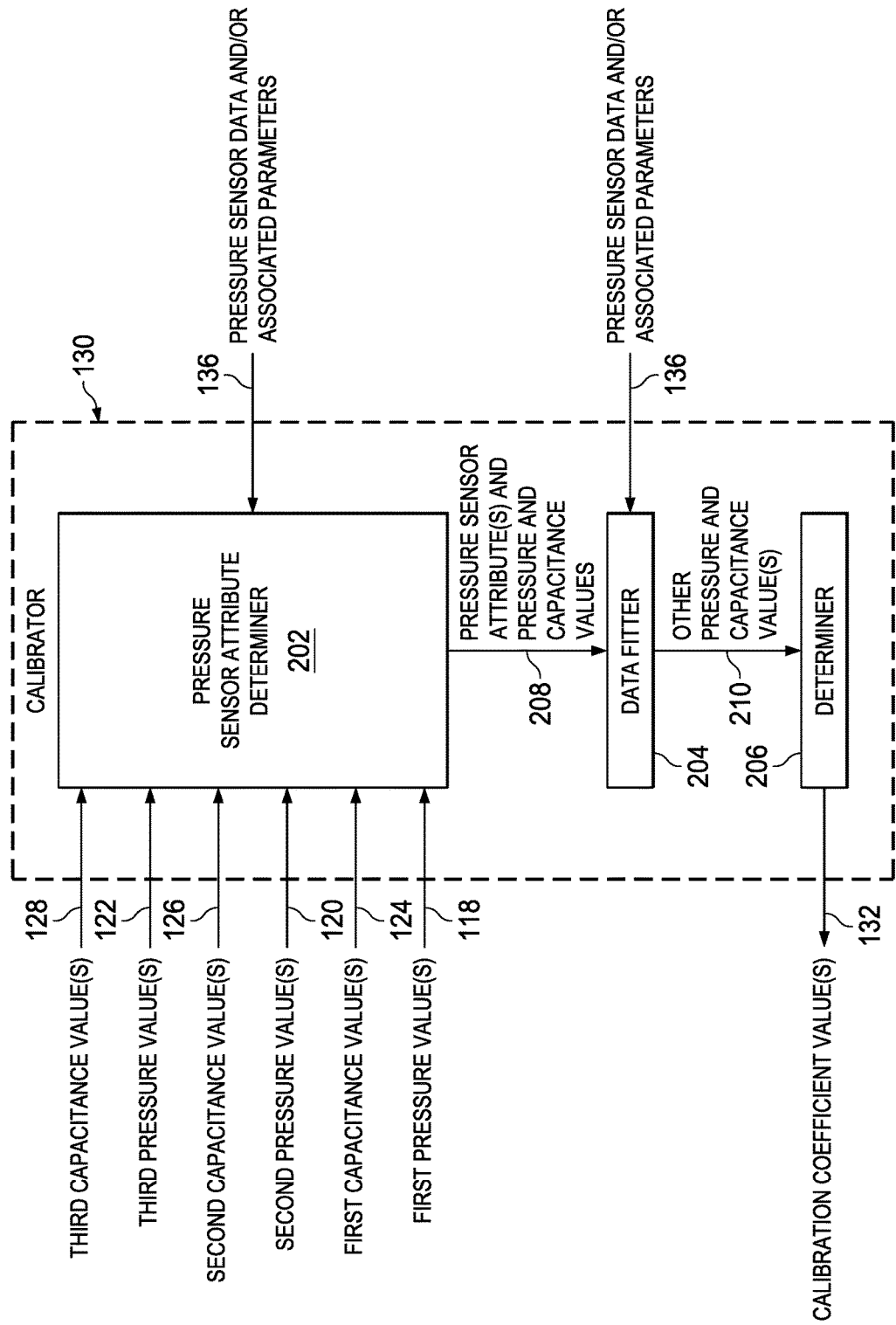
FIG. 2 is a schematic illustration of an example implementation of the example calibrator of FIG. 1.

FIG. 2 illustrates an example implementation of the calibrator 130 of FIG. 1. In the illustrated example, the calibrator 130 includes an example pressure sensor attribute determiner 202, an example data fitter 204 and an example determiner 206. In the illustrated example, to determine different attributes 208 of the pressure sensor 104 such as, for example, the effective gap, $g_{eff}$, and/or the plate thickness, t, of the pressure sensor 104, the pressure sensor attribute determiner 202 accesses the first, second and third pressure values 118, 120, 122, the first, second and third capacitance values 124, 126, 128 and the pressure sensor data and/or associated parameters 136 and processes these values using, for example, Equations 7 and 8 to determine the pressure sensor attributes 808.

To determine other and/or extrapolate the pressure and capacitance values 118, 120, 122, 124, 126, 128, in the illustrated example, the data fitter 204 accesses the pressure sensor attributes 208 and the pressure and capacitance values 118, 120, 122, 124, 126, 128 from the pressure sensor attribute determiner 202 and the pressure sensor data and/or associated parameters 136 and determines other values and/or extrapolates and/or fits pressure and capacitance values 210 using the sensor equation fit of Equation 9 and then places the data in a simpler form using the 5th order polynomial fit equation of Equation 12.

To determine the calibration coefficient values 132 to be used to calibrate the pressure sensor 104, the determiner 206 accesses the other pressure and capacitance values 210 from the data fitter 204 and processes the other pressure and capacitance values 210 to determine the calibration coefficient values 132. Thus, using the examples disclosed herein, the example calibrator 130 determines the calibration coefficient values 132 based on physical tests performed on the pressure sensor 104 without performing more extensive testing on the pressure sensor 104, such as, physical testing involving a pressure chamber.

While an example manner of implementing the example of implementing the example calibrator 130 of FIG. 1 is illustrated in FIG. 2, one or more of the elements, processes and/or devices illustrated in FIG. 2 may be combined, divided, re-arranged, omitted, eliminated and/or implemented in any other way. Further, the example pressure sensor attribute determiner 202, the example data fitter 204, the example determiner 206 and/or the example calibrator 130 of FIG. 2 may be implemented by hardware, software, firmware and/or any combination of hardware, software and/or firmware. Thus, for example, any of the example pressure sensor attribute determiner 202, the example data fitter 204, the example determiner 206 and/or the example calibrator 130 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example pressure sensor attribute determiner 202, the example data fitter 204, the example data fitter 206 and/or the example calibrator 130 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example calibrator 130 of FIG. 1 may include one or more elements, processes and/or devices in addition to, or instead of, those illustrated in FIG. 2, and/or may include more than one of any or all of the illustrated elements, processes and devices.

Figure 3:
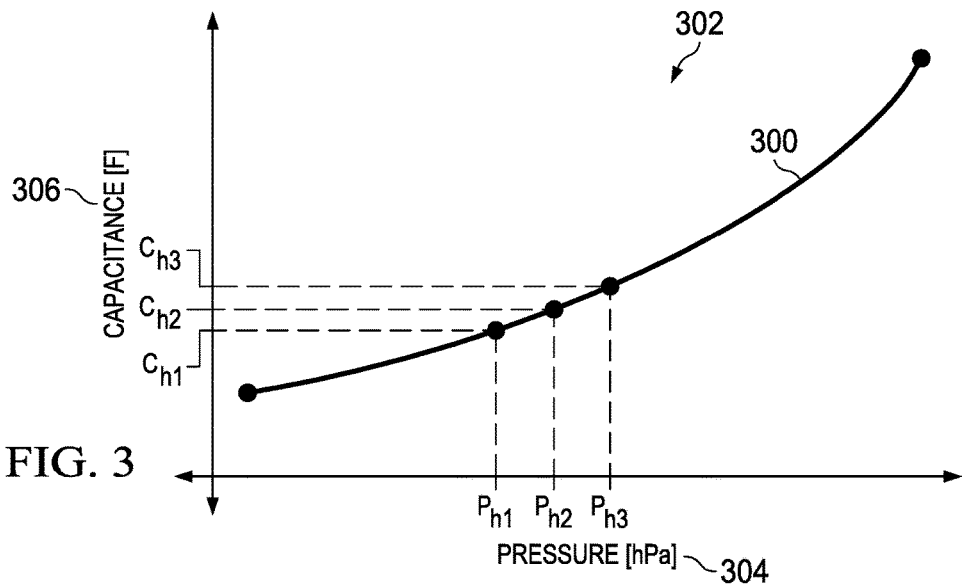
FIG. 3 is an example graph of capacitance versus pressure illustrating results obtained using the examples disclosed herein.

FIG. 3 illustrates the example graph 302 including resultant capacitances of the pressure sensor 104 being exposed to different pressures at different heights. The graph 302 of FIG. 3 includes the x-axis 304 that represents pressure and the y-axis 306 that represents capacitance.

Figure 4:
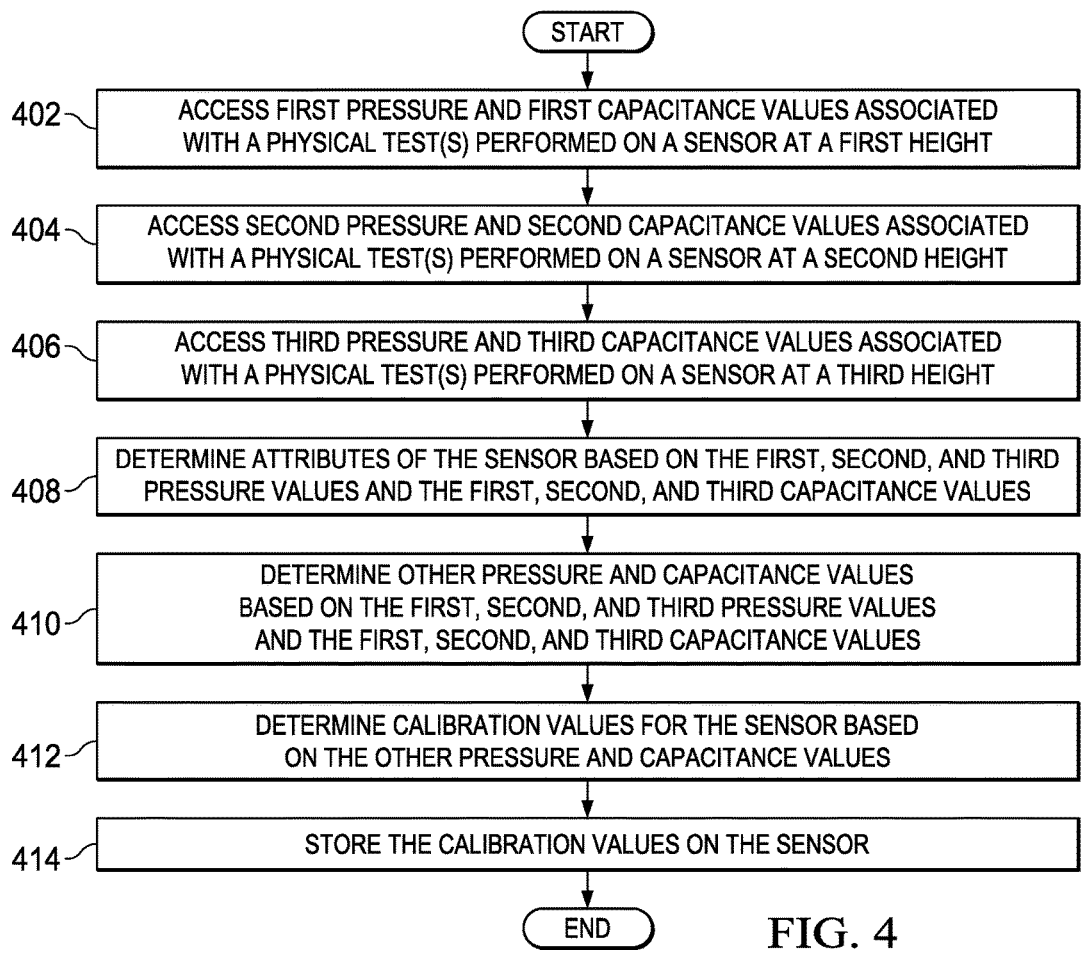
FIG. 4 is a flowchart representative of machine readable instructions that may be executed to implement the example calibrator of FIGS. 1 and/or 2.

A flowchart representative of example machine readable instructions for implementing the example calibrator 130 of FIGS. 1 and 2 are shown in FIG. 4. In this example, the machine readable instructions comprise a program for execution by a processor such as the processor 512 shown in the example processor platforms 500 discussed below in connection with FIG. 5. The program may be embodied in software stored on a tangible computer readable storage medium such as a CD-ROM, a floppy disk, a hard drive, a digital versatile disk (DVD), a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowchart illustrated in FIG. 4, many other methods of implementing the example calibrator 130 may alternatively be used. For example, the order of execution of the blocks may be changed, and/or some of the blocks described may be changed, eliminated, or combined.

As mentioned above, the example processes of FIG. 4 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 4 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program of FIG. 4 begins with the calibrator 130 and/or the pressure sensor attribute determiner 202 accessing the first pressure and first capacitance values 118, 124 associated with the physical tests performed on the pressure sensor 104 at the first height 112 (block 402). The calibrator 130 and/or the pressure sensor attribute determiner 202 accesses the second pressure and second capacitance values 120, 126 associated with the physical tests performed on the pressure sensor 104 at the second height 114 (block 404). The calibrator 130 and/or the pressure sensor attribute determiner 202 accesses the third pressure and third capacitance values 122, 128 associated with the physical tests performed on the pressure sensor 104 at the third height 116 (block 406).

The calibrator 130 and/or the pressure sensor attribute determiner 202 determines attributes 208 of the pressure sensor 104 based on the first, second and third pressure values 118, 120, 122 and the first, second and third capacitance values 124, 126, 128 (block 408). In some examples, the attributes include the effective gap, $g_{eff}$, of the pressure sensor 104 and/or the plate thickness, t, of the pressure sensor 104. The calibrator 130 and/or the data fitter 204 accesses the pressure sensor attributes 208, the pressure and capacitance values 118, 120, 122, 124, 126, 128 and the pressure sensor data and/or associated parameters 136 and determines other values and/or extrapolates and/or fits the pressure and capacitance values 210 using an example sensor equation fit and/or places the data in a simpler form using an example 5th order polynomial fit equation (block 410).

The calibrator 130 and/or the determiner 206 determines the calibration coefficient values 132 to be used to calibrate the pressure sensor 104 by processing the other pressure and capacitance values 210 to determine the calibration coefficient values 132 (block 412). The calibration coefficient values 132 are stored on the pressure sensor 104 (block 414).

Figure 5:
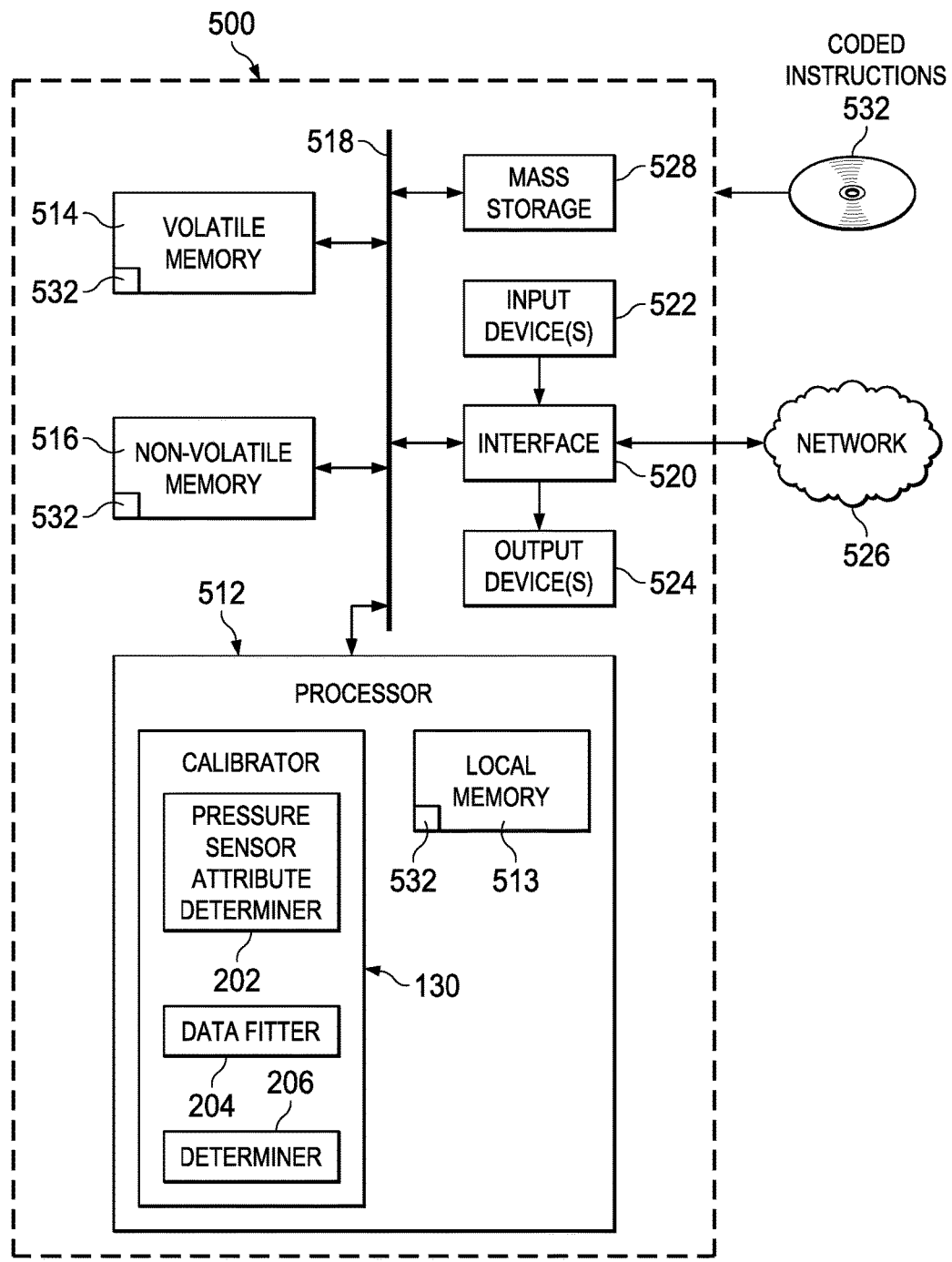
FIG. 5 illustrates a processor platform which may execute the instructions of FIG. 4 to implement the example calibrator of FIGS. 1 and/or 2.

FIG. 5 is a block diagram of an example processor platform 500 capable of executing the instructions of FIG. 4 to implement the calibrator 130 of FIGS. 1 and 2. The processor platform 500 can be, for example, a server, a personal computer, a mobile device (e.g., a cell phone, a smart phone, a tablet such as an iPad™), a personal digital assistant (PDA), an Internet appliance, or any other type of computing device.

The processor platform 500 of the illustrated example includes a processor 512. The processor 512 of the illustrated example is hardware. For example, the processor 512 can be implemented by one or more integrated circuits, logic circuits, microprocessors or controllers from any desired family or manufacturer. In this example, the processor 512 implements the example pressure sensor attribute determiner 202, the example data fitter 204 and the example determiner 206 and the example calibrator 130.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), and/or a PCI express interface.

In the illustrated example, one or more input devices 522 are connected to the interface circuit 520. The input device(s) 522 permit(s) a user to enter data and commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED)). The interface circuit 520 of the illustrated example, thus, typically includes a graphics driver card, a graphics driver chip or a graphics driver processor.

The interface circuit 520 of the illustrated example also includes a communication device such as a transmitter, a receiver, a transceiver, a modem and/or network interface card to facilitate exchange of data with external machines (e.g., computing devices of any kind) via a network 526 (e.g., an Ethernet connection, a digital subscriber line (DSL), a telephone line, coaxial cable, a cellular telephone system, etc.).

The processor platform 500 of the illustrated example also includes one or more mass storage devices 528 for storing software and/or data. Examples of such mass storage devices 528 include floppy disk drives, hard drive disks, compact disk drives, Blu-ray disk drives, RAID systems, and digital versatile disk (DVD) drives.

The coded instructions 532 of FIG. 4 may be stored in the mass storage device 528, in the volatile memory 514, in the non-volatile memory 516, and/or on a removable tangible computer readable storage medium such as a CD or DVD.

From the foregoing, it will be appreciated that the above disclosed methods, apparatus and articles of manufacture relate to calibrating micro-electromechanical systems (MEMS) such as, for example, pressure sensors and/or capacitive based barometric pressure sensors. Specifically, the examples disclosed herein relate to calibrating pressure sensors based on obtained values when the pressure sensors are at different positions and/or heights and/or other sensor attributes determined and/or estimated. By taking such an approach, the examples disclosed herein enable the efficient calibration of a large quantity of pressure sensors.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A pressure sensor calibration apparatus, comprising:
a calibrator configured to determine calibration coefficient values to calibrate a pressure sensor based on first pressure and capacitance values obtained at a first height, second pressure and capacitance values obtained at a second height, and third pressure and capacitance values obtained at a third height.

2. The pressure sensor calibration apparatus of claim 1, wherein the calibrator is configured to store the calibration coefficient values on the pressure sensor.

3. The pressure sensor calibration apparatus of claim 1, wherein the calibrator is configured to predict other associated pressure and capacitance values for the pressure sensor based on the first pressure and capacitance values, the second pressure and capacitance values, and the third pressure and capacitance values.

4. The pressure sensor calibration apparatus of claim 1, wherein the calibrator is configured to determine calibration coefficient values for a plurality of pressure sensors including the pressure sensor.

5. A method, comprising:
   determining calibration coefficient values to calibrate a pressure sensor based on first pressure and capacitance values obtained at a first height, second pressure and capacitance values obtained at a second height, and third pressure and capacitance values obtained at a third height.

6. The method of claim 5, further including storing the calibration coefficient values on the pressure sensor.

7. The method of claim 5, further including predicting other associated pressure and capacitance values for the pressure sensor based on the first pressure and capacitance values, the second pressure and capacitance values, and the third pressure and capacitance values.

8. A tangible machine-readable storage disk or storage device comprising instructions which, when executed, cause a machine to at least:
   determine calibration coefficient values to calibrate a pressure sensor based on first pressure and capacitance values obtained at a first height, second pressure and capacitance values obtained at a second height, and third pressure and capacitance values obtained at a third height.

9. The machine-readable storage disk or device of claim 8, wherein the instructions, when executed, cause the machine to store the calibration coefficient values on the pressure sensor.

10. The machine-readable storage disk or device of claim 8, wherein the instructions, when executed, cause the machine to predict other associated pressure and capacitance values for the pressure sensor based on the first pressure and capacitance values, the second pressure and capacitance values, and the third pressure and capacitance values.

11. The machine-readable storage disk or device of claim 8, wherein the instructions, when executed, cause the machine to determine calibration coefficient values for a plurality of pressure sensors including the pressure sensor.

* * * * *